Patented June 2, 1942

2,284,889

UNITED STATES PATENT OFFICE 2,284,889

METHOD OF DESTROYING ALGAE IN COOLING TOWERS

Gerald M. Fisher, Los Angeles, Calif., assignor to Socony-Vacuum Oil Company, Incorporated, New York, N. Y., a corporation of New York No Drawing. Application February 17, 1941, Serial No. 379,381

1 Claim. (Cl. 210—23)

It is well known that the growth of algae in cooling towers, spray condensers, and the like often interferes seriously with their functioning and requires frequent and expensive cleaning operations.

Salts of copper and silver have been used to prevent such growths and are effective, but require constant and extremely slow feeding to maintain the desired concentration of the metal and an undue amount of attention to the feeding devices.

I have discovered that the copper naphthenates have a highly developed algicidal property and that their water solubility, ranging from 10 to 12 parts per million, is substantially the optimum dosage for preventing completely the growth of algae.

It remains then merely to place a small quantity of this material in contact with the water which is being circulated through the system (not in any make-up water supply) in order to maintain the water in the system at the optimum copper concentration, the limited solubility of the naphthenate rendering itself limiting as to dosage. This contact may be made by placing the naphthenate in any water permeable container, such as a wire mesh basket or burlap bag, suspended in the water to be treated.

I claim as my invention:

The method of preventing the growth of algae in water pools, cooling towers, spray condensers and the like which consists in immersing a body of copper naphthenate in the water to be treated.

GERALD M. FISHER.